United States Patent [19]

Kubozuka et al.

[11] Patent Number: 4,782,795
[45] Date of Patent: Nov. 8, 1988

[54] ANTI-KNOCK SYSTEM FOR AUTOMOTIVE INTERNAL COMBUSTION ENGINE

[75] Inventors: Takao Kubozuka, Yokosuka; Yoshinori Hirano, Yokohama, both of Japan

[73] Assignee: Nissan Motor Co., Ltd., Yokohama City, Japan

[21] Appl. No.: 27,330

[22] Filed: Mar. 18, 1987

[30] Foreign Application Priority Data

Mar. 22, 1986 [JP] Japan ................................. 61-64485

[51] Int. Cl.$^4$ ............................ F01P 3/22; F02P 5/04
[52] U.S. Cl. ................................. 123/41.21; 123/425
[58] Field of Search .................... 123/425, 41.2–41.27

[56] References Cited

U.S. PATENT DOCUMENTS

| | | | |
|---|---|---|---|
| 4,367,699 | 1/1983 | Evans | 123/41.23 |
| 4,549,514 | 10/1985 | Abe et al. | 123/425 |
| 4,590,565 | 5/1986 | Takasu et al. | 123/425 |
| 4,601,264 | 7/1986 | Hirano | 123/41.27 |
| 4,605,164 | 8/1986 | Hayas Hi et al. | 237/2 A |
| 4,616,602 | 10/1986 | Hirano et al. | 123/41.27 |
| 4,630,572 | 12/1986 | Evans | 123/41.21 |

FOREIGN PATENT DOCUMENTS

0059423 9/1982 European Pat. Off. .
54-57035 5/1979 Japan .
56-32026 7/1981 Japan .
57-57608 12/1982 Japan .
60-243321 12/1985 Japan .
61-19919 1/1986 Japan .

Primary Examiner—Tony M. Argenbright
Assistant Examiner—Eric R. Carlberg
Attorney, Agent, or Firm—Foley & Lardner, Schwartz, Jeffery, Schwaab, Mack, Blumenthal & Evans

[57] ABSTRACT

An engine anti-knock control arrangement controls both the ignition timing system and an evaporative cooling system so that when the engine is operating in a predetermined engine speed and load zone and engine knock is detected, the cooling system is operated to reset the temperature to which the coolant (and therefore the engine) should be controlled, to a predetermined minimum value and the ignition timing incrementally retarded until the knocking phenomenon terminates. While the temperature is dropping and knocking is absent, the ignition timing is incrementally advanced until the knock threshold is reached and thus brings the timing as close as practical to the MBT value for the instant set of operating conditions. Cyclic repetition of the ignition timing advancement and retardation holds the timing at MBT while the engine is operating in the predetermined zone.

11 Claims, 7 Drawing Sheets

ANTI-KNOCK SYSTEM FOR AUTOMOTIVE INTERNAL COMBUSTION ENGINE

BACKGROUND OF THE INVENTION

Field of the Invention

The present invention relates generally to an evaporative type cooling system for an internal combustion engine wherein liquid coolant is permitted to boil and the vapor used as a vehicle for removing heat therefrom, and more specifically to such a system which is able to very rapidly vary the temperature of the engine in a manner wherein in addition to permitting the temperature of the engine to be controlled to a level suited for the instant set of operating conditions, permits specific control which enables engine knock to be attenuated and/or obviated without the need to retard the ignition to the degree that engine power output is lost during modes of operation when high power output is in demand.

Description of the Prior Art

In currently used "water cooled" internal combustion engines liquid is forcefully circulated by a water pump, through a cooling circuit including the engine coolant jacket and an air cooled radiator. This type of system encounters the drawback that a large volume of water is required to be circulated between the radiator and the coolant jacket in order to remove the required amount of heat.

Due to the large mass of water inherently required, the warm-up characteristics of the engine are undesirably sluggish. For example, if the temperature difference between the inlet and discharge ports of the coolant jacket is 4 degrees, the amount of heat which 1 Kg of water may effectively remove from the engine under such conditions is 4 Kcal. Accordingly, in the case of an engine having an 1800 cc displacement (by way of example) is operated full throttle, the cooling system is required to remove approximately 4000 Kcal/h. In order to achieve this, the water pump is required to produce a flow rate of approximately 167 liter/min between the coolant jacket and the radiator. This of course undesirably places a parasitic load on the engine which consumes several horsepower.

Further, the large amount of coolant utilized in this type of system renders the possibility of quickly changing the temperature of the coolant to suit the instant set of engine operational conditions such as load and engine speed, completely out of the question.

With this type of cooling system if the the engine is subject to "knocking" the only practical method of dealing with this problem is to retard the ignition timing.

Figure 1:
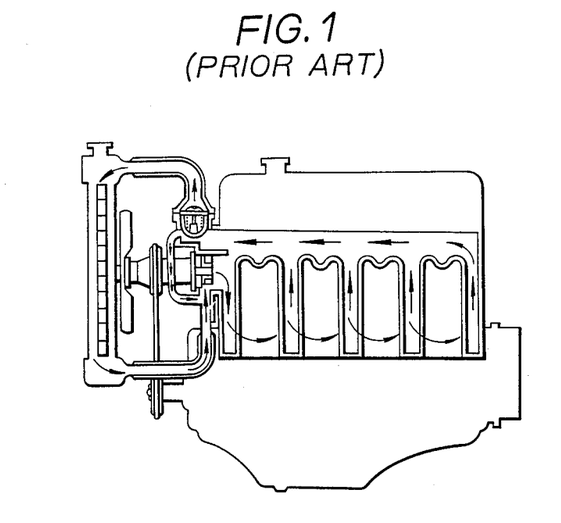
FIGS. 1-5 show the prior art arrangements discussed in the opening paragraphs of the instant disclosure.
Figure 2:
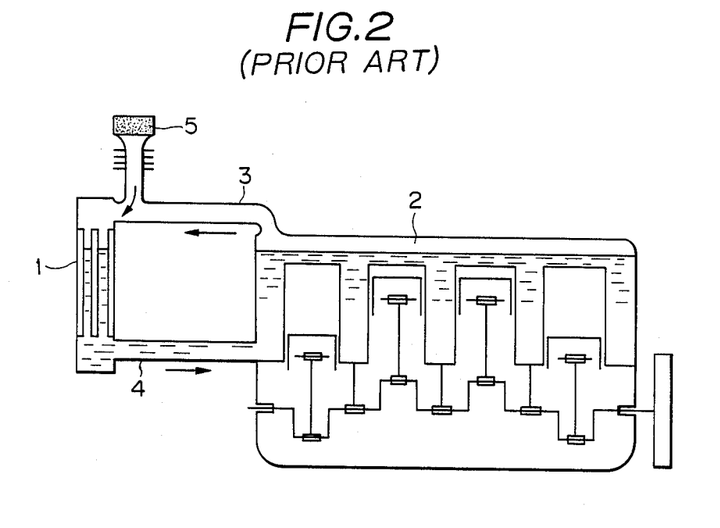

FIG. 2 shows an arrangement disclosed in Japanese Patent Application Second Provisional Publication No. Sho. 57-57608. This arrangement has attempted to vaporize a liquid coolant and use the gaseous form thereof as a vehicle for removing heat from the engine. In this system the radiator 1 and the coolant jacket 2 are in constant and free communication via conduits 3, 4 whereby the coolant which condenses in the radiator 1 is returned to the coolant jacket 2 little by little under the influence of gravity.

This arrangement while eliminating the power consuming coolant circulation pump which plagues the above mentioned arrangement, has suffered from the drawbacks that the radiator, depending on its position with respect to the engine proper, tends to be at least partially filled with liquid coolant. This greatly reduces the surface area through which the gaseous coolant (for example steam) can effectively release its latent heat of vaporization and accordingly condense, and thus has lacked any notable improvement in cooling efficiency.

Further, with this system in order to maintain the pressure within the coolant jacket and radiator at atmospheric level, a gas permeable water shedding filter 5 is arranged as shown, to permit the entry of air into and out of the system.

However, this filter permits gaseous coolant to readily escape from the system, inducing the need for frequent topping up of the coolant level. A further problem with this arrangement has come in that some of the air, which is sucked into the cooling system as the engine cools, tends to dissolve in the water, whereby upon start up of the engine, the dissolved air tends to come out of solution and forms small bubbles in the radiator which adhere to the walls thereof and form an insulating layer. The undissolved air tends to collect in the upper section of the radiator and inhibit the convection-like circulation of the vapor from the cylinder block to the radiator. This of course further deteriorates the performance of the device.

As the interior of this system is maintained constantly at atmospheric pressure via the provision of the air permeable filter 5, this system has lacked the ability to vary the internal pressure of the system which permits the boiling point of the coolant to be modified and thus enable the temperature of the engine to be varied in accordance with the instant set of operating conditions and therefore has not provided any particular solution to the occurence of engine knock.

Further, when the engine is not in use atmospheric air is permitted to contact the upper sections of the interior of the cooling system and induce rapid rusting and the like degradation.

European Patent Application Provisional Publication No. 0 059 423 published on Sept. 8, 1982 discloses another arrangement wherein, liquid coolant in the coolant jacket of the engine, is not forcefully circulated therein and permitted to absorb heat to the point of boiling. The gaseous coolant thus generated is adiabatically compressed in a compressor so as to raise the temperature and pressure thereof and thereafter introduced into a heat exchanger (radiator). After condensing, the coolant is temporarily stored in a reservoir and recycled back into the coolant jacket via a flow control valve.

This arrangement has suffered from the drawback that when the engine is stopped and cools down the coolant vapor condenses and induces sub-atmospheric conditions which tend to induce air to leak into the system. During subsequent engine operation this air tends to be forced by the compressor along with the gaseous coolant into the radiator. Due to the difference in specific gravity, the above mentioned air tends to rise in the hot environment while the coolant which has condensed moves downwardly. The air, due to this inherent tendency to rise, tends to form pockets of air which cause a kind of "embolism" in the radiator and which badly impair the heat exchange ability thereof.

Experiments have shown that the provision of the compressor renders the control of the pressure prevailing in the coolant jacket of the system for the purpose of varying the coolant boiling point with load and/or engine speed, difficult.

U.S. Pat. No. 4,367,699 issued on Jan. 11, 1983 in the name of Evans (see FIG. 3 of the drawings) discloses an engine cooling system wherein the coolant is boiled and the vapor used to remove heat from the engine. This arrangement features a separation tank 6 wherein gaseous and liquid coolant are initially separated. The liquid coolant is fed back to the cylinder block 7 under the influence of gravity while the relatively dry gaseous coolant (steam for example) is condensed in a fan cooled radiator 8.

Figure 3:
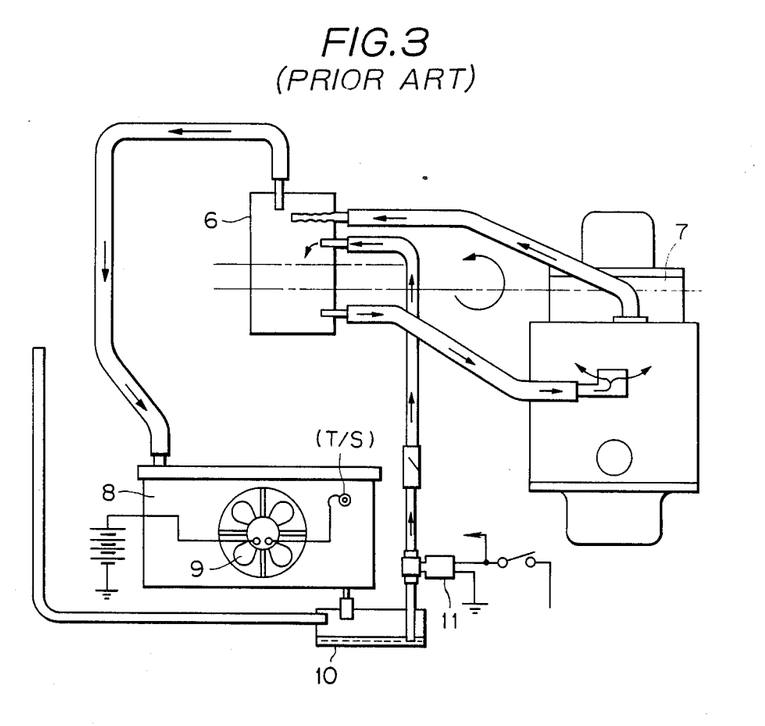

The temperature of the radiator is controlled by selective energizations of the fan 9 which matches the rate of condensation therein with the engine load and the rate that coolant vapor is generated and in a manner which is sufficient to provide a liquid seal at the bottom of the device. Condensate discharged from the radiator via the above mentioned liquid seal is collected in a small reservoir-like arrangement 10 and pumped back up to the separation tank via a small constantly energized pump 11.

This arrangement, while providing an arrangement via which air can be initially purged to some degree from the system tends to, due to the nature of the arrangement which permits said initial non-condensible matter to be forced out of the system, suffers from rapid loss of coolant when operated at relatively high altitudes. Once the engine cools air is relatively freely admitted back into the system. The provision of the bulky separation tank 6 also renders engine layout difficult.

Further, as the rate of condensation in the consensor is controlled by a temperature sensor (T/S) disposed on or in the consensor per se, in a manner which holds the pressure and temperature within the system essentially constant, temperature variation with load is rendered impossible thus preventing any possibility of engine knock control via temperature variation.

Japanese Patent Application First Provisional Publication No. Sho. 56-32026 (see FIG. 4 of the drawings) discloses an arrangement wherein the structure defining the cylinder head and cylinder liners are covered in a porous layer of ceramic material 12 and wherein coolant is sprayed into the cylinder block from shower-like arrangements 13 located above the cylinder heads 14. The interior of the coolant jacket defined within the engine proper is essentially filled with gaseous coolant during engine operation at which time liquid coolant is constantly sprayed onto the ceramic layers 12.

Figure 4:
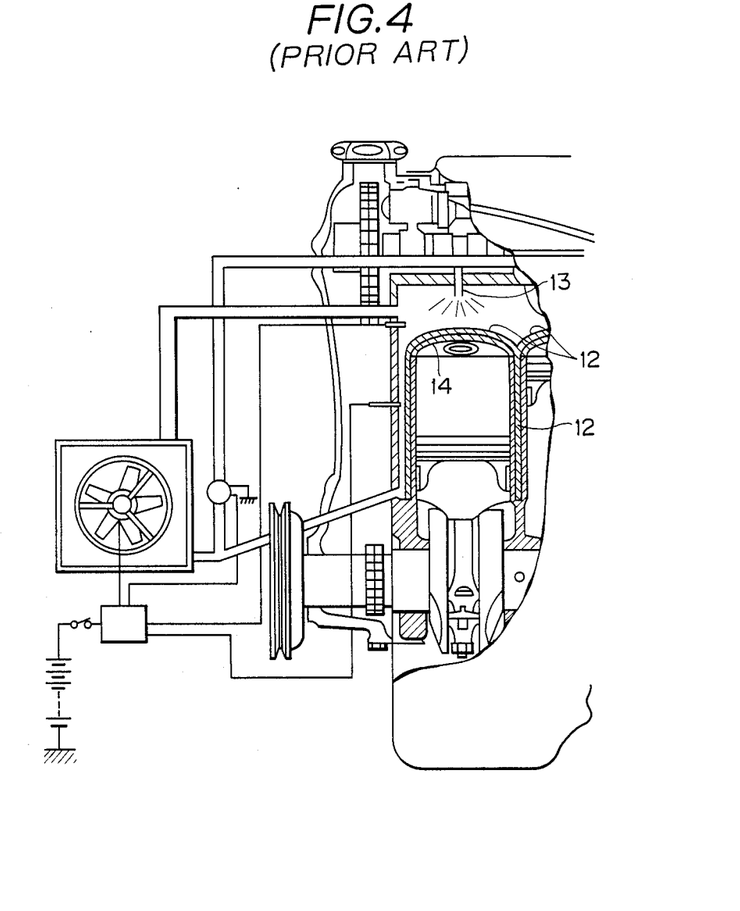

However, this arrangement has proven totally unsatisfactory in that upon boiling of the liquid coolant absorbed into the ceramic layers, the vapor thus produced and which escapes toward and into the coolant jacket, inhibits the penetration of fresh liquid coolant into the layers and induces the situation wherein rapid overheat, formation of localized hot spots and thermal damage of the ceramic layers 12 and/or engine soon results. Engine knock is actually promoted by this arrangement.

Figure 5:
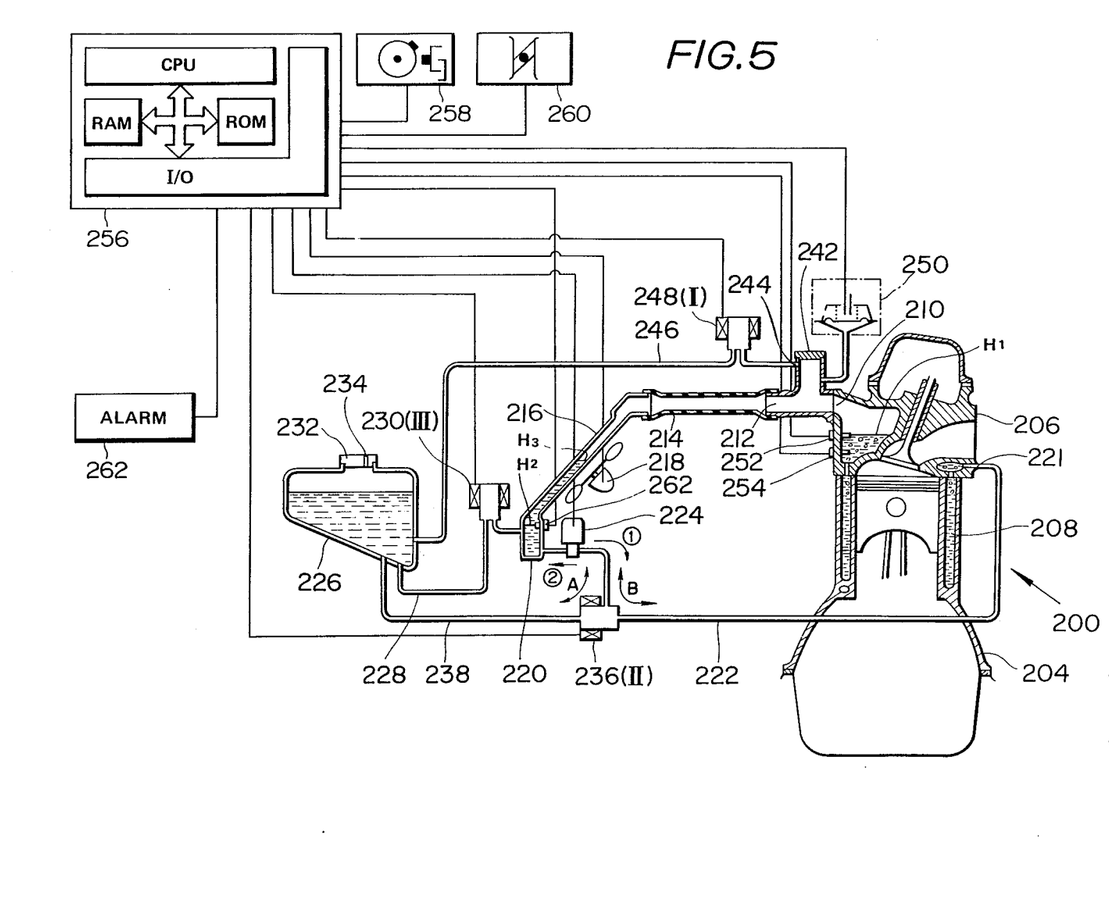

FIG. 5 shows an arrangement which is disclosed in U.S. Pat. No. 4,616,602 issued on Oct. 14, 1986 in the name of Hirano et al. The disclosure of this application is hereby incorporated by reference thereto. For ease of reference the same numerals as used in the above mentioned Patent are also used in FIGS. 5 and 8 of the instant document.

This arrangement has enabled the temperature of the engine to be very rapidly controlled despite external influences such as cold winds etc., by providing a system which actually pumps coolant into and out of the cooling circuit which is hermetically sealed during engine operation, thus enabling the pressure and therefore the boiling point of the coolant to be rapidly modified.

Figure 6:
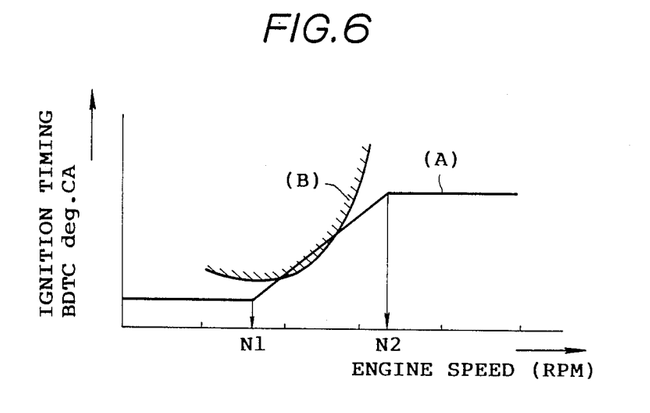
FIG. 6 is a graph showning in terms of ignition timing and engine speed, the timing which will produce MTB and the zone in which engine knock is apt to be induced by this ideal timing.

However, under given circumstances despite the fact that engine knock tends to be inherently inhibited by the evaporative cooling, said undesirable phenomenon tends to occur. For example, as shown in FIG. 6 the solid line trace (A) which denotes the theoretical MBT (Minimum spark advance for Best Torque) ignition timing for the instant type of engine, intersects the curved line (B) which denotes the knocking threshold between the engine speeds denoted by N1 and N2.

Figure 7:
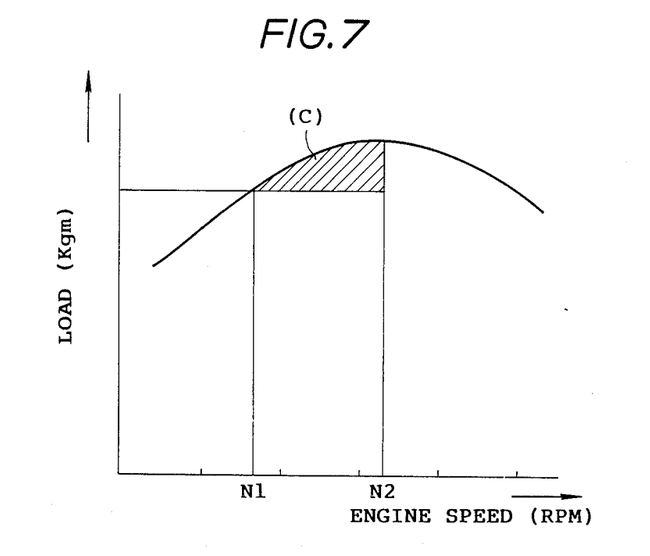
FIG. 7 is a graph showing in terms of engine load and engine speed, the load zone in which engine knocking can be expected using the timing schedule shown in FIG. 6.

Further, as shown in FIG. 7 knocking (hatched zone C) only tends to occur above a predetermined load (T) while the engine is operating within the above mentioned engine speed range of N1–N2.

Once knocking is encountered it is necessary to retard the ignition timing significantly from that required for MBT and thus induces the drawback that combustion characteristics and power generation are deteriorated at time when large amounts of power are in demand.

SUMMARY OF THE PRESENT INVENTION

The present invention is based on the realization that not only is it possible to improve engine charging and thermal efficiency of the engine depending on its mode of operation using evaporative cooling but also to employ evaporative cooling in conjunction with ignition control in a manner which permits the threshold at which engine knock occurs to be modified and the need to retard the ignition timing reduced.

An object of the present invention is to provide a knock control system which enables engine knock to be suppressed under high load operation with the minimum amount of power reducing ignition timing reduction.

In brief, the above object is achieved generally by an engine anti-knock control arrangement which controls both the ignition timing system and an evaporative cooling system so that when the engine is operating in a predetermined engine speed and load zone and engine knock is detected, the cooling system is operated to reset the temperature to which the coolant (and therefore the engine) should be controlled to a predetermined minimum value and the ignition timing incrementally retarded until the knocking phenomenon terminates. While the temperature is dropping and knocking is absent, the ignition timing is incrementally advanced until the knock threshold is reached and thus bring the timing as close as practical to the MBT value for the instant set of operating conditions. Cyclic repetition of the ignition timing advancement and retardation holds the timing at MBT while the engine is operating in the predetermined zone.

More specifically, a first aspect of the present invention comes in the form of a method of controlling an internal combustion engine which is characterized by the steps of: (a) detecting the engine operating in a predetermined mode; (b) sensing the presence of engine knock; (c) reducing the temperature of the engine toward a predetermined lower limit using an evaporative cooling technique; (d) retarding the engine ignition timing by incremental amounts; (e) sensing the termination of the engine knock; and (d) advancing the ignition timing by incremental amounts until the engine knocking threshold is reached.

A second aspect of the present invention comes in the form of a method of operating a spark ignition internal combustion engine which is characterized by the steps of: sensing the engine speed; sensing the engine load; determining the engine to be operating a predetermined mode based on the sensed engine speed and load; sensing the presence of engine knock while the engine is operating in the predetermined mode; reducing the temperature of the engine toward a predetermined lower limit in response to the detection of engine knock using an evaporative cooling technique; retarding the engine ignition timing; sensing the termination of the engine knock; and advancing the ignition timing until the threshold of engine knock is reached.

A third aspect of the present invention comes in the form of an internal combustion engine which includes a closed loop cooling circuit comprising: a coolant jacket disposed about structure of the engine subject to high heat flux, the coolant jacket being arranged to receive coolant in a liquid state, permit the liquid coolant to boil and discharge the same in a vaporized form, a radiator in fluid communication with the coolant jacket in which the coolant vapor produced in the coolant jacket is condensed to its liquid state, and means for returning the liquid coolant formed in the radiator to the coolant jacket in a manner which maintains the structure immersed in a predetermined depth of liquid coolant; an engine operational parameter sensor; an arrangement associated with the condensor for varying the pressure prevailing therein; an engine ignition control system; an engine knock sensor; a control circuit responsive to the parameter sensor and the knock sensor, the control circuit being operatively connected with the pressure varying arrangement and the ignition system, the control circuit including means for: determining a target temperature to which the coolant should be controlled for the instant mode of engine operation; controlling the pressure varying arrangement in a manner to control the temperature of the coolant in the coolant jacket at the target value; detecting the engine operating in a predetermined mode; setting the target temperature to a predetermined minimum value and retarding the engine ignition in the event that the engine is detected knocking while operating in the predetermined mode; determining that the engine knocking has terminated in response to one or both of the temperature reduction and the ignition retardation; advancing the ignition timing while the engine is operating in the predetermined mode until the engine knock threshold is reached.

DETAILED DESCRIPTION OF THE PREFERRED EMBODIMENT

Before proceeding with the description of the embodiment of the present invention, it is deemed appropriate to discuss some of the basic features of the type of cooling system to which the present invention is applied.

A suitable coolant temperature for an engine during low load/low speed modes of engine operation (e.g. so called urban cruising) is approximately 100°-110° C.; while in the case of low speed/high load mode of operation (such as towing etc.,) a suitable temperature range is 80°-90° C. In the case of high speed/high load modes of operation a temperature range of 90°-100° C. is deemed suitable.

The high temperature during "urban cruising" promotes improved thermal efficiency. On the other hand, the lower temperatures during the other modes mentioned above are such as to ensure that sufficient heat is removed from the engine and associated structure to prevent engine knocking and/or thermal damage.

With this cooling system advantage is taken of the fact, that as the coolant is boiled and the vapor used as a heat transfer medium, the amount of coolant actually circulated between the coolant jacket and the radiator is very small, the amount of heat removed from the engine per unit volume of coolant is very high, and upon boiling, the pressure prevailing within the coolant jacket and consequently the boiling point of the coolant rises if the system employed is of the closed circuit type.

Thus, during "urban cruising" by circulating only a limited amount of cooling air over the radiator, it is possible to reduce the rate of condensation therein and cause the pressure within the cooling system to rise above atmospheric and thus induce the situation, wherein the engine coolant boils at temperatures above 100° C. for example at approximately 110° C.

In addition to the control afforded by the air circulation this system is arranged to positively pump coolant into and out of the system so as to vary the amount of coolant actually in the cooling circuit thereof and thus modifiy the pressure prevailing therein. The combination of the two controls enables the temperature at which the coolant boils to be quickly brought to and held close to that deemed most appropriate for the instant set of operation conditions.

On the other hand, during high speed cruising for example, when a lower coolant boiling point is highly beneficial, it is further possible by increasing the flow cooling air passing over the radiator (such as by more frequent use of a cooling fan or like device), to increase the rate of condensation within the radiator to a level which reduces the pressure prevailing in the cooling system below atmospheric and thus induce the situation wherein the coolant boils at temperatures in the order of 80°-100° C. In addition to this, it is also possible for coolant to be displaced out of the cooling circuit in a manner which lowers the pressure in the system and supplements the control provide by the fan in a manner which permits the temperature at which the coolant boils to be quickly brought to and held at a level most appropriate for the new set of operating conditions.

However, if the pressure in the system drops to an excessively low level the tendency for air to find its way into the interior of the cooling circuit becomes excessively high and it is desirable under these circumstances to limit the degree to which a negative pressure is permitted to develop. The instant system controls this by introducing coolant into the cooling circuit while it remains in an essentially hermetically sealed state and thus raises the pressure in the system to a suitable level.

For further details concerning the determination of the above mentioned temperature ranges reference may be had to U.S. Pat. No. 4,630,574 issued on Dec. 23, 1986 in the name of Hirano.

Figure 8:
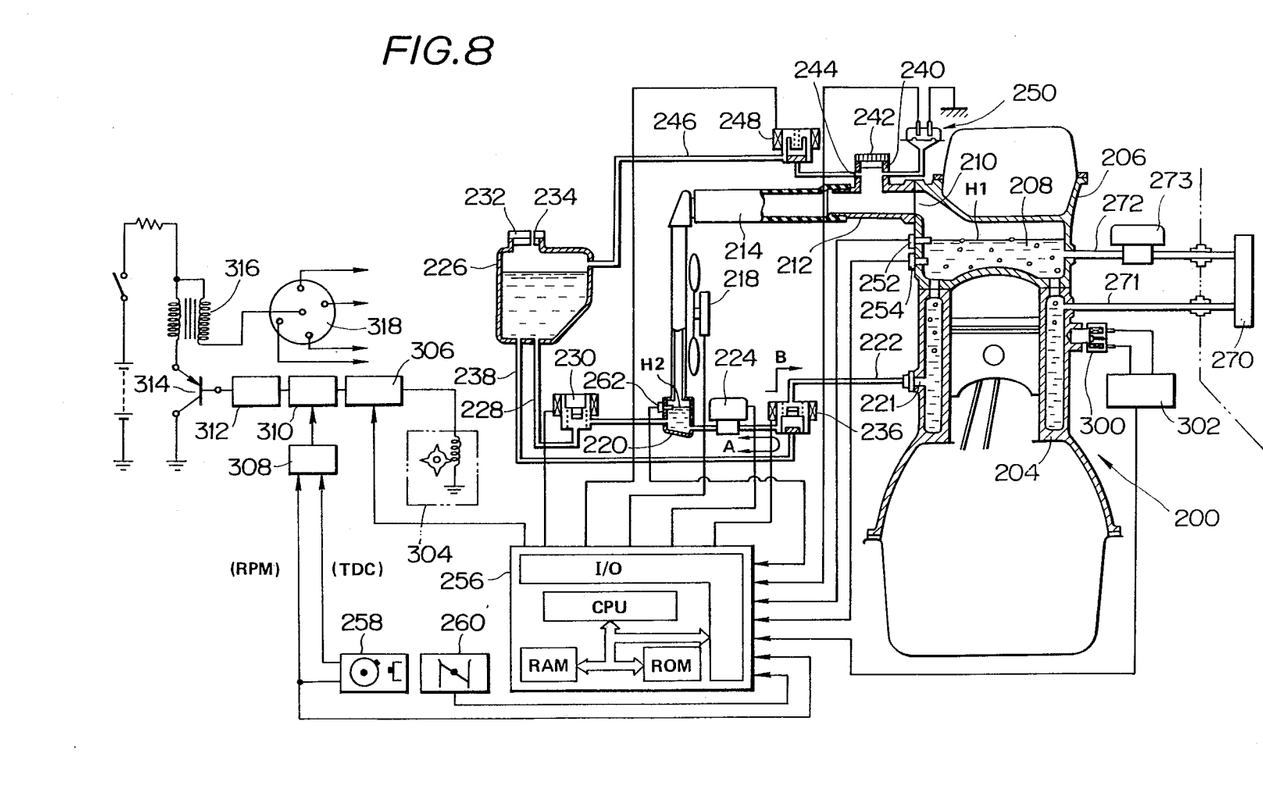
FIG. 8 shows an embodiment of the present invention.

FIG. 8 of the drawings shows an embodiment of the present invention. In this arrangement an internal combustion engine 200 includes a cylinder block 204 on which a cylinder head 206 is detachably secured. The cylinder head and block are formed with suitable cavities which define a coolant jacket 208 about structure of the engine subject to high heat flux (e.g. combustion chambers exhaust valves conduits etc.,). Fluidly communicating with a vapor discharge port 210 formed in the cylinder head 206 via a vapor manifold 212 and vapor conduit 214, is a condensor 216 or radiator as it will be referred to hereinafter.

Located adjacent the radiator 216 is a selectively energizable electrically driven fan 218 which is arranged to induce a cooling draft of air to pass over the heat exchanging surface of the radiator 216 upon being put into operation.

If desired this fan can be arranged to be energizable at different levels. For further reference concerning this facet of the instant system reference may be had to copending U.S. patent application Ser. No. 849,115 filed Apr. 7, 1986 in the name of Hirano et al, now U.S. Pat. No. 4,694,784.

A small collection reservoir 220 or lower tank as it will be referred to hereinafter, is provided at the bottom of the radiator 216 and arranged to collect the condensate produced therein. Leading from the lower tank 220 to a coolant inlet port 221 formed in the cylinder block 204 is a coolant return conduit 222.

A small capacity electrically driven pump 224 is disposed in this conduit at a location relatively close to the radiator 216. According to the present invention, this pump 224 is arranged to be reversible—that is energizable so as to induct coolant from the lower tank 220 and pump same toward the coolant jacket 208 (viz., pump coolant in a first flow direction) and energizable so as to pump coolant in the reverse direction (second flow direction)—i.e. induct coolant through the return conduit 222 and pump it into the lower tank 220. The reason for this particular arrangement is to permit the above mentioned introduction and removal of liquid coolant for the purposes of internal pressure control.

A coolant reservoir 226 is arranged to communicate with the the lower tank 220 via a supply conduit 228 in which an electromagnetic flow control valve 230 is disposed. This valve is arranged to closed when energized.

The reservoir 226 is closed by a cap 232 in which an air bleed or similar vent arrangement 234 is formed. This permits the interior of the reservoir 226 to be maintained constantly at amospheric pressure.

A three-way valve 236 is disposed in the coolant return condiut 222 and arranged to communicate with the reservoir 226 via a level control conduit 238. This valve is arranged to have a first state wherein fluid communication is established between the pump 224 and the reservoir 226 (viz., flow path A) and a second state wherein communication between the pump 224 and the coolant jacket 208 is established (viz., flow path B).

The vapor manifold 212 is formed with a riser portion 240. This riser portion 240 as shown, is provided with a cap 242 which hermetically closes same and further formed with a purge port 244. This latter mentioned port 244 communicates with the reservoir 226 via an overflow conduit 246.

A normally closed ON/OFF type electromagnetic valve 248 is disposed in conduit 246 and is arranged to be open only when energized. This valve can be arranged to act as an emergency pressure relief valve in addition to it usual function.

Also communicating with the riser 240 is a pressure differential responsive diaphragm operated switch arrangement 250 which assumes an open state upon the pressure prevailing within the cooling circuit (viz., the coolant jacket 208, vapor manifold 214, vapor conduit 214, radiator 216 and return conduit) dropping below atmospheric pressure by a predetermined amount. In this embodiment the switch 250 is arranged to open upon the pressure in the cooling circuit falling to a level in the order of $-30$ to $-50$ mmHg.

In order to control the level of coolant in the coolant jacket, a level sensor 252 is disposed as shown. It will be noted that this sensor 252 is arranged to sense the level of liquid coolant being at or below a predetermined level (H1) which is selected to be higher than that of the combustion chambers, exhaust ports and valves (structure subject to high heat flux) so as to maintain same securely immersed in a predetermined depth of liquid coolant and therefore attenuate engine knocking and the like due to the formation of localized zones of abnormally high temperature or "hot spots".

Located below the level sensor 252, so as to be immersed in the liquid coolant, is a temperature sensor 254. The output of the level sensor 252 and the temperature sensor 254 are fed to a control circuit 256 or modulator which includes a microprocessor.

The control circuit 256 further receives an input from a signal generator circuit 258 which in this instance is adapted to output a plurality of signals. Viz., a first signal indicative of engine speed and a second signal indicative of a selected cylinder reaching its TDC position.

A load sensing device 260 such as a throttle valve position sensor is arranged to input a signal indicative of the instant engine load to the control circuit 256. It will be noted that as an alternative to throttle position, the output of an air flow meter, an induction vacuum sensor or the pulse width of a fuel injection control signal may be used to indicate load.

A second level sensor 262 is disposed in the lower tank 220 at a level H2. The purpose for the provision of this sensor is to enable the level of the coolant in the lower tank being above or below a predetermined minimum level and enable decisions relating to the feasibility of pumping coolant out of the coolant circuit for example.

For further disclosure relating to the function and operation of this sensor reference may be had to U.S. Pat. No. 4,616,602 incorporated by reference hereinbefore.

In this embodiment a cabin heating includes a heater core 270 disposed in a vehicle cabin, a coolant supply conduit 271 which leads from a port formed in the cylinder block 204 to the core 270 and a return conduit 272 which leads from the core to a port formed in the cylinder head 206.

A coolant circulation pump 273 is disposed in the coolant return conduit 272. For further details concerning the arrangement and operation of the heater circuit of the nature described above, and to the possible variations thereof reference may be had to U.S. Pat. No. 4,605,164 issued on Aug. 12, 1986 in the name of Hayashi et al.

A knock sensor 300 is operatively attached to the cylinder block 204 of the engine 200 and arranged to sense the generation of a vibration indicative of engine knock being generated in a selected one of the plurality of engine cylinders. The output of the sensor 300 is applied to a filter circuit 302 which filters out the various background noises. The output of the filter circuit 302 is applied in digitized form to the I/O of the microprocessor included in the control circuit 256.

The knock control arrangement further includes a signal generator 304 which is arranged to produce a train of pulses each of which occurs at a predetermined crank angle before the piston in each cylinder reaches its TDC position. In this embodiment this generator is adapted for use with a 4 cylinder 4 cycle engine.

The output of generator 304 is applied to a ignition advance/retard control circuit 306 along with a control signal from control circuit 256. This latter mentioned signal contains data indicating whether the ignition timing should be incrementally advanced or retarded. The nature and mode of generation of this signal will become better understood hereinlater when a discussion of the control program set in the ROM of the microprocessor is made.

A basic ignition timing signal generator 308 receives inputs indicative of engine speed and TDC of the selected cylinder. This circuit is arranged to produce an output of the nature shown by trace A in FIG. 6.

The output of the basic timing signal generator 308 is applied to a comparator 310 wherein it is compared with the output of ignition advance/retard control circuit 306. It should be noted that in this embodiment the comparator 310 is arranged so that the amount which the actual ignition signal can be advanced with respect to the basic signal from circuit 308 is limited to 10% irrespective of commands to advance the timing in excess thereof which might be produced by the control circuit 256.

In the absence of an output from the control circuit, control of the ignition is conducted according to the output of basic ignition timing signal generator 308 and/or in response to other conventional circuitry not shown.

A pulse shaping circuit 312 is interposed between the comparator 310 and a power transistor 314 which forms part of a conventional ignition arrangement including a ignition coil 316 and distributor 318.

COOLING SYSTEM OPERATION OVERVIEW

Prior to use the cooling circuit is filled to the brim with coolant—e.g. water containing a small amount of anti-corrosive or a mixture of water and antifreeze or the like. Following this the cap 242 is securely set in place to seal the system. A suitable quantity of additional coolant is also placed in the reservoir 226.

During this filling operation the electromagnetic valve 230 should be temporarily energized so as to assume a closed condition and three-way valve 236 conditioned to establish flow path B or similar precautions be taken to facilitate the complete filling of the system and the exclusion of any air.

When the engine is started, as the coolant jacket is completely filled with stagnant coolant and no positive circulation is effected, the heat produced by the combustion in the combustion chambers cannot be readily released via the radiator 216 to the ambient atmosphere and the coolant rapidly warms and begins to produce coolant vapor.

At this time valve 230 is left de-energized (open) whereby the pressure of the coolant vapor begins displacing liquid coolant out of the cooling circuit (viz., the coolant jacket 208, vapor manifold 212, vapor conduit 214, radiator 216, lower tank 220 and return conduit 222). During this "coolant displacement mode" it is possible for either of two situations to occur. That is to say, it is possible for the level of coolant in the coolant jacket 208 to be reduced to level H1 before the level in the radiator 216 reaches level H2 or vice versa, viz., wherein the radiator 216 is emptied to level H2 before much of the coolant in the coolant jacket 208 is displaced. In the event that latter occurs (viz., the coolant level in the radiator falls to H2 before that in the coolant jacket reaches H1), valve 230 is temporarily closed and an amount of the excess coolant in the coolant jacket 208 allowed to "distill" over to the radiator 216 before valve 230 is reopened.

Alternatively, if the level H1 is reached first, level sensor 252 induces the energization of pump 224 and coolant is pumped from the lower tank 220 to the coolant jacket 208 while simultaneously being displaced out through conduit 228 to reservoir 226. During this displacement mode, the load and other operational parameters of the engine (viz., the outputs of the sensors 258 and 260) are sampled and a decision made as to the temperature at which the coolant should be controlled to boil.

If the desired temperature is reached before the amount of the coolant in the cooling circuit is reduced to its minimum permissible level (viz., when the coolant in the coolant jacket and the radiator are at levels H1 and H2 respectively) it is possible to energize valve 230 so that it assumes a closed state and places the cooling circuit in a hermetically closed condition.

If the temperature at which the coolant boils should exceed that determined to be best suited for the instant set of engine operational conditions, three-way valve 236 may be set to establish flow path A and the pump 224 energized briefly to pump a quantity of coolant out of the cooling circuit to increase the surface "dry" (internal) surface area of the radiator 216 available for the coolant vapor to release its latent heat of evaporation and to simultaneously lower the pressure prevailing within the cooling circuit. It should be noted however, that upon the coolant in the circuit being reduced to the minimum level (viz., when the levels in the coolant jacket 208 and the lower tank 220 assumes levels H1 and H2 respectively) the displacement of coolant from the circuit is terminated in order to prevent a shortage of coolant therein.

On the other hand, should the ambient conditions be such that the rate of condensation in the radiator 216 is higher than that desired (viz., overcooled) and the pressure within the system overly lowered to assume a subatmospheric level (for example), three-way valve 236 is conditioned to produce flow path A and the pump 224 operated to induct coolant from the reservoir 226 and force same into the radiator 216 via the lower tank 220 until it reaches level H3 (by way of example). With this the pressure prevailing in the cooling circuit is raised and the surface area available for heat exchange reduced. Accordingly, the boiling point of the coolant is immediately modified by the change in internal pressure while the amount of heat which may be released from the system reduced.

Therefore, it is possible to rapidly elevate the boiling point to that determined to be necessary. When the engine 200 is stopped it is advantageous to maintain valve 230 energized (viz., closed) until the pressure differential responsive switch arrangement 250 opens. This obviates the problem wherein large amounts of coolant are violently discharged from the cooling circuit due to the presence of superatmospheric pressures therein.

KNOCK CONTROL

Figure 9:
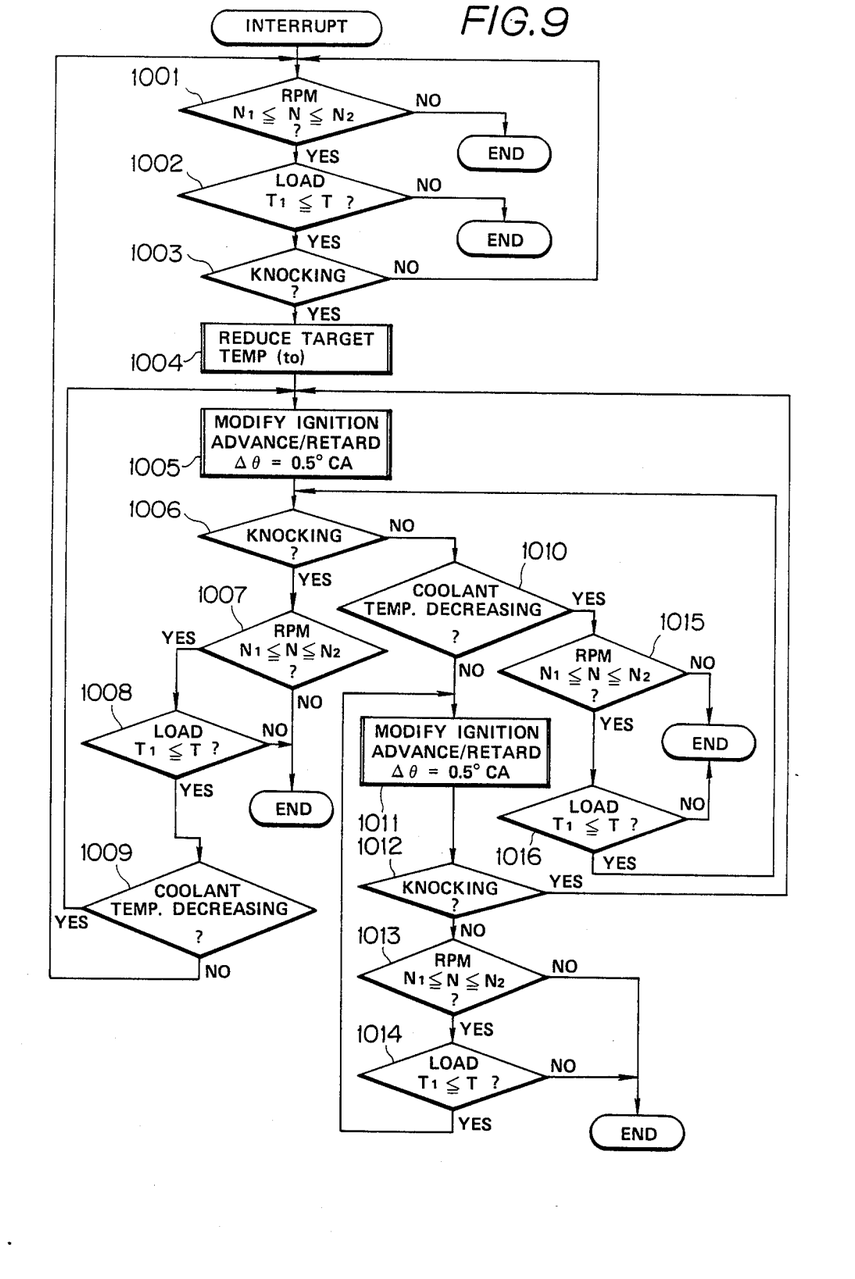
FIG. 9 is a flow chart showing the characteristic steps which are executed in the arrangement shown in FIG. 8.

In order to implement the control which underlies the instant invention a control program of the nature shown in FIG. 9 is set in the ROM of the microprocessor.

At step 1001 of the above mentioned control program the engine speed is sampled and ranged to determine if the engine is operating within the predetermined engine speed (viz., is operating in the range of N1 to N2). At step 1002 the engine load is sampled and ranged to determine if the engine is operating above the predetermined load (T). In the event that the outcome of both of these steps is positive then it is assumed that the engine is operating in the previously described predetermined mode (see FIGS. 6 and 7) and at step 1003 the output of the engine knock sensor is sampled to determine if the engine is knocking or not.

If the outcome of this enqiry is negative then the program recycles to step 1001. On the other hand, if the engine is found to be knocking then at step 1004 a sub-routine which lowers the instant TARGET temperature to a predetermined minimum value (to) (for example 80° C.) is run. This sub-routine is such as to arbitarily reset the normal TARGET value which is determined on the basis of engine speed and engine load and which is intended to produce the optimal engine operational conditions.

In response to the running of this sub-routine the fan 218 is immediately energized and if the temperature differential between the instant coolant temperature and (to) is sufficiently large and if the coolant level in the lower tank 220 is above level H2, then valve 236 is set to establish flow path A and pump 224 energized to pump a quantity of liquid coolant out of the cooling circuit in a manner which reduces the pressure and therefore the boiling point of the coolant retained therein. This causes the temperature of the engine to rapidly decrease irrespective of the effect of external ambient conditions.

However, as it takes some seconds for the temperature to reach the minimum TARGET value (to), an ignition timing control sub-routine is run at step 1005. This sub-routine may include steps such as sampling the output of the knock sensor and determinining in response to positive or negative results whether the ignition timing needs to be retarded or advanced respectively.

In this instance as the engine is inevitably still knocking the instant sub-routine issues a command to circuit 306 which retards the instant ignition timing by a predetermined incremental value. In this embodiment the value is selected to be 0.5° CA (CA=crank angle). At step 1006 the output of the knock sensor is again sampled and the presence or absence of engine knock determined.

If the engine is still knocking at steps 1008 and 1009 the engine speed and load are sampled and ranged in manner similar to that performed in steps 1001 and 1002, to determine if the engine is still operating in the predetermined mode.

If the engine is found to be operating out of the predetermined mode the program ends, while in the event the engine is still operating in said mode then at step 1009 the output of the temperature sensor 254 is sampled and a determination made as to whether the temperature of the engine is still above (to) and still dropping toward the same.

If the temperature is still dropping then the program recycles to step 1005 while in the event that (to) has been reached then the program recycles to step 1001.

On the other hand, if the engine is found to be not knocking at step 1006 then the program goes to step 1010 wherein the instant temperature status of the engine is determined. If the temperature is still falling toward the minimum value (to) then the engine speed and load are ranged again (steps 1015 and 1016) to determine if the engine is operating in the required mode or not. If not the program ends while if the ranging indicates a positive result then the program recycles to step 1006.

However, if at step 1010 the temperature is found to be at (to) then at step 1011 the ignition timing control sub-routine is run. As the engine is not knocking at this time this sub-routine will advance the ignition timing by 0.5° CA and then determine if the knocking threshold has been reached at step 1012. In the event that the threshold has been reached (viz., weak engine knocking is detected) then the program recycles to step 1005 wherein the ignition timing control sub-routine retards the ignition and then subsequently samples for engine knock at step 1006.

On the other hand, if the engine is not knocking then at steps 1013 and 1014 the engine speed and load are ranged to again determine if the engine is operating in the predetermined range. In the event of a positive result the program recycles to step 1011 to further advance the engine ignition timing while in the event of a negative result the program ends.

In the event that the engine is determined to be knocking such as step 1006 but the engine found to be operating out of the predetermined range in steps 1007 and 1008 it is possible that the knocking will automatically terminate under the new mode of engine operation. Alternatively, it is within the scope of the present invention to effect knock control using a conventional knock control technique.

As will be appreciated in the above discribed flow chart steps 1001 to 1005 will be implemented in the event that upon entering the predetermined high load zone engine knocking is detected and will induce an immediate reduction in engine temperature.

During the temperature decline steps 1006 to 1014 will cyclically retard and advance the ignition timing by small increments in a manner which will hold the timing at the knock threshold and thus ensure that the best possible engine performance is maintained for the instant engine temperature. Upon reaching the predetermined minimum the feedback control is maintained to keep the timing just at the knock threshold.

As will be appreciated the rapidity with which the advance/retard feedback control is performed makes the rate at which the temperature of the engine is decreased appear relatively gradual. However, in actual fact the reduction in temperature will usually be effected in the order of seconds.

It will be appreciated that the present invention is not limited to application to the cooling system illustrated in FIG. 8 and that other similar evaporative cooling systems which are capable of reducing the temperature of the engine to suitably low levels upon command may also be used.

What is claimed is:

1. In a method of controlling an internal combustion engine the step of:
   (a) detecting the engine operating in a predetermined mode;
   (b) sensing the presence of engine knock;
   (c) reducing the temperature of the engine toward a predetermined lower limit using an evaporative cooling technique in response to engine knock being sensed;
   (d) retarding the engine ignition timing by incremental amounts in response to engine knock being detected;
   (e) sensing the termination of the engine knock; and
   (f) advancing the ignition timing by incremental amounts until the engine knocking threshold is reached.

2. A method as claimed in claim 1, further comprising the step of cyclically advancing and retarding the ignition timing in a manner to hold the timing at the knocking threshold while the engine is operating in said predetermined mode.

3. A method as claimed in claim 1, wherein said step of detecting comprises:
   (e) sensing the engine speed;
   (f) sensing the engine load;
   (g) determining the engine speed to be within a first predetermined range; and
   (h) determining the engine load to be within a second predetermined range.

4. A method as claimed in claim 1, wherein said step of temperature reducing comprises:
   (i) removing heat from said engine by immersing components of the engine which are subject to a high heat flux in a liquid coolant;
   (j) permitting the coolant to absorb heat and boil;
   (k) condensing the coolant vapor produced by the boiling of the liquid coolant at a rate which is sufficiently high as to reduce the temperature of the engine toward said predetermined lower limit.

5. A method as claimed in claim 4, wherein said temperature reducing step further includes:
   positively pumping liquid coolant out of a closed loop cooling circuit in which said liquid coolant is boiled and subsequently condensed, to reduce the pressure therein and thus reduce the boiling point of the liquid coolant in which the heated components are immersed.

6. A method as claimed in claim 1, further comprising the step of varying the temperature of said engine toward a target value which is determined in accordance with steps (e) and (f) when the engine is operating in modes other than said predetermined one.

7. In a method of operating a spark ignition internal combustion engine the steps of:
   sensing the engine speed;
   sensing the engine load;
   determining the engine to be operating at a predetermined mode based on the sensed engine speed and load;
   sensing the presence of engine knock while the engine is operating in said predetermined mode;
   reducing the temperature of the engine toward a predetermined lower limit in response to the detection of engine knock using an evaporative cooling technique;
   retarding the engine ignition timing;
   sensing the termination of the engine knock;
   advancing the ignition timing until the threshold of engine knock is reached.

8. In an internal combustion engine
   a closed loop cooling circuit comprising:
      a coolant jacket disposed about structure of the engine subject to high heat flux, said coolant jacket being arranged to receive coolant in a liquid state, permit the liquid coolant to boil and discharge the same in a vaporized form,
      a radiator in fluid communication with said coolant jacket in which the coolant vapor produced in said coolant jacket is condensed to its liquid state, and
      means for returning the liquid coolant formed in said radiator to said coolant jacket in a manner which maintains said structure immersed in a predetermined depth of liquid coolant;
   an engine operational parameter sensor;
   an arrangement associated with said condensor for varying the pressure prevailing therein;
   an engine ignition control system;
   an engine knock sensor;
   a control circuit responsive to said parameter sensor and said knock sensor, said control circuit being operatively connected with said pressure varying arrangement and said ignition system, said control circuit including means for:
      determining a target temperature to which the coolant should be controlled for the instant mode of engine operation;
      controlling said pressure varying arrangement in a manner to control the temperature of the coolant in said coolant jacket at the target value;
      detecting the engine operating in a predetermined mode;
      setting the target temperature to a predetermined minimum value and retarding the engine ignition in the event that the engine is detected knocking while operating in said predetermined mode;
      determining that the engine knocking has terminated in response to the temperature reduction and the ignition retardation;
      advancing the ignition timing while the engine is operating in said predetermined mode until the engine knock threshold is reached.

9. An internal combustion engine as claimed in claim 8, wherein said coolant returning means comprises:
   a coolant return conduit which fluidly interconnects a lower portion of said radiator and said coolant jacket;
   a reversible pump disposed in said coolant return conduit; and
   a level sensor which senses the level of liquid coolant in said coolant jacket and which issues a signal indicative of the level of liquid coolant in the coolant jacket falling below a predetermined minimum level, said pump and said level sensor being operatively connected through said control circuit in a manner which selectively energizes said pump to pump in a first flow direction when said level sensor indicates a low level in said coolant jacket.

10. A internal combustion engine as claimed in claim 9, wherein said pressure varying arrangement comprises:
a cooling fan disposed with said radiator for inducing a cooling draft of cooling medium thereover when energized;
a reservoir in which liquid coolant is stored, said reservoir being discrete from said closed loop cooling circuit defined by said coolant jacket, said radiator and said coolant returning means;
valve and conduit means for selectively interconnecting said reservoir and said closed loop cooling circuit, said valve and conduit means including:
a three-way valve disposed in said coolant return conduit at a location between said pump and said coolant jacket; and
a level control conduit leading from said three-way valve to said reservoir, said three-way valve having a first state wherein fluid communication between said radiator and said coolant jacket is interrupted and communication between said radiator and said reservoir established, and a second position wherein communication between said reservoir and said radiator is interrupted and communication between said radiator and said coolant jacket established,
said three-way valve and said reversible pump being operatively connected with said control circuit in a manner which permits said three- way valve to set in said first state and for said pump to be energized to pump in said first flow direction so as to pump liquid coolant out of said closed loop cooling circuit in a manner which reduces the pressure prevailing in said closed loop cooling circuit and which reduces the boiling point of the liquid coolant in said coolant jacket.

11. An internal combustion engine as claimed in claim 10, wherein said valve and conduit means further comprises:
a supply conduit which leads from said reservoir to said radiator;
a second valve disposed in said supply conduit, said valve having a first position wherein communication between said reservoir and said radiator is permitted and a second position wherein the communication between said reservoir and said radiator is prevented;
an overflow conduit which fluidly communicates an upper section of the closed loop cooling circuit at one end and which communicates with said reservoir at the other end thereof;
a third valve disposed in said overflow conduit, said third valve having a first position wherin fluid communication between said closed loop cooling circuit and said reservoir via said overflow conduit is prevented and a second position wherein communication is permitted.

* * * * *